United States Patent
Neumann

(10) Patent No.: US 11,645,521 B2
(45) Date of Patent: May 9, 2023

(54) METHODS AND SYSTEMS FOR BIOLOGICALLY DETERMINED ARTIFICIAL INTELLIGENCE SELECTION GUIDANCE

(71) Applicant: KPN Innovations, LLC, Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 434 days.

(21) Appl. No.: 16/779,017

(22) Filed: Jan. 31, 2020

(65) Prior Publication Data

US 2021/0241091 A1    Aug. 5, 2021

(51) Int. Cl.
*G06N 3/08* (2006.01)
*G06N 3/06* (2006.01)

(52) U.S. Cl.
CPC ............... *G06N 3/08* (2013.01); *G06N 3/061* (2013.01)

(58) Field of Classification Search
CPC ........ G16H 50/20; G16H 50/70; G16H 20/60; G16H 10/60; G16H 20/00; G16H 20/30; G06N 3/08; G06N 20/00; G06Q 30/031; G16B 40/00
See application file for complete search history.

(56) References Cited

U.S. PATENT DOCUMENTS

| | | | |
|---|---|---|---|
| 7,437,344 B2 | 10/2008 | Peyrelevade | |
| 9,064,279 B1 | 6/2015 | Tuan et al. | |
| 10,365,033 B2 | 7/2019 | Furuta et al. | |
| 2007/0156504 A1 | 7/2007 | Myers et al. | |
| 2008/0162186 A1 | 7/2008 | Jones | |
| 2014/0136362 A1 | 5/2014 | Shaya et al. | |
| 2015/0105279 A1 | 4/2015 | Touumazou et al. | |
| 2018/0032698 A1 | 2/2018 | Lau et al. | |
| 2018/0144820 A1 | 5/2018 | Grimmer et al. | |
| 2019/0189255 A1 | 6/2019 | Karvela et al. | |
| 2022/0059214 A1* | 2/2022 | Jung | G16H 50/70 |

FOREIGN PATENT DOCUMENTS

| | | |
|---|---|---|
| KR | 101878105 B | 7/2018 |
| WO | 2018204763 | 11/2018 |

OTHER PUBLICATIONS

Tom Ryan, Under Armour links purchase recommendations to fitness data, Website, Jun. 16, 2016 https://retailwire.com/discussion/under-armour-links-purchase-recommendations-to-fitness-data/.

* cited by examiner

*Primary Examiner* — Hau H Hoang
(74) *Attorney, Agent, or Firm* — Caldwell Intellectual Property Law

(57) ABSTRACT

A system for biologically determined artificial intelligence selection guidance includes a computing device designed and configured to receive at least a biological extraction and an item descriptor from a user, generate, using a classification algorithm and a plurality of past extractions, a user classifier matching user data to user sets, identify, using the classifier and the element user data, a user set identifier matching the user, produce a selection guidance using the user set identifier and the item category identifier, and provide the selection guidance to the user.

20 Claims, 5 Drawing Sheets

US 11,645,521 B2

METHODS AND SYSTEMS FOR BIOLOGICALLY DETERMINED ARTIFICIAL INTELLIGENCE SELECTION GUIDANCE

FIELD OF THE INVENTION

The present invention generally relates to the field of artificial intelligence. In particular, the present invention is directed to methods and systems for biologically determined artificial intelligence selection guidance.

BACKGROUND

Selection guidance are often generated using past selection histories collected from a multiplicity of past interactions. However, overabundant information can produce inaccurate results due to overgeneralization.

SUMMARY OF THE DISCLOSURE

In an aspect, a system for biologically determined artificial intelligence selection guidance includes a computing device designed and configured to receive at least a biological extraction and an item descriptor from a user, generate, using a classification algorithm and a plurality of past extractions, a user classifier matching user data to user sets, identify, using the classifier and the element user data, a user set identifier matching the user, produce a selection guidance using the user set identifier and the item category identifier, and provide the selection guidance to the user.

In another aspect, a method of biologically determined artificial intelligence selection guidance includes receiving, by a computing device, at least a biological extraction and an item descriptor from a user. The method includes generating, by the computing device and using a classification algorithm and a plurality of past extractions, a user classifier matching user data to user sets. The method includes identifying, by the computing device, using the classifier and the element user data, a user set identifier matching the user. The method includes producing, by the computing device a selection guidance using the user set identifier and the item category identifier. The method includes providing, by the computing device, the selection guidance to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein provide for generation of selection guidance matching a user profile of a particular user, which may include biological extraction data. In embodiments, guidance may be further filtered or refined to match parameters pertaining to a user, based on biological extraction.

Figure 1:
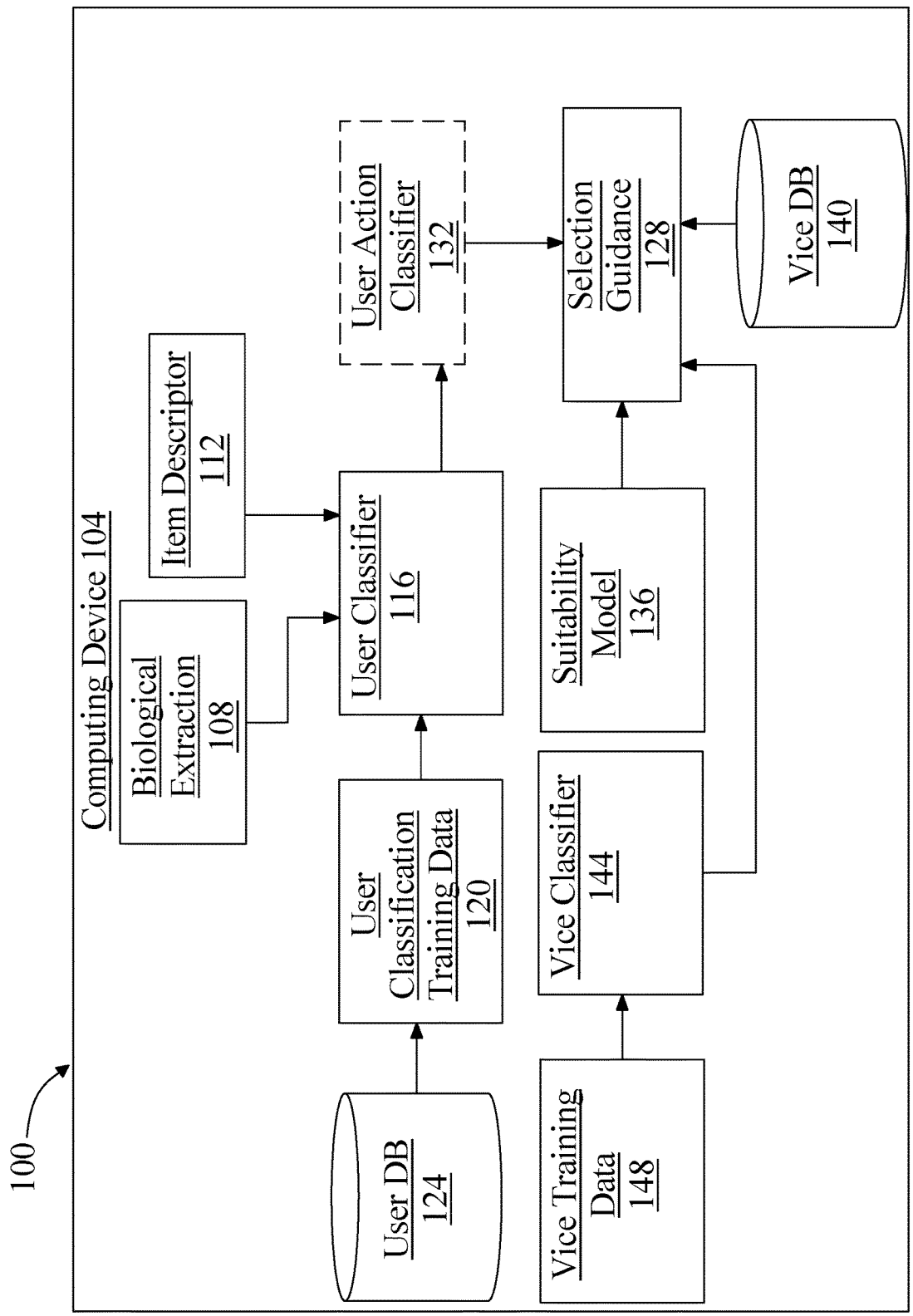
FIG. 1 is a block diagram illustrating an exemplary embodiment of a system for biologically determined artificial intelligence selection guidance.

Referring now to FIG. 1, an exemplary embodiment of a system 100 for biologically determined artificial intelligence selection guidance is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device or cluster of computing devices a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is designed and configured to receive at least an element of user data. At least an element of user data may include, without limitation, at least a biological extraction 108. A "biological extraction" as used in this disclosure includes at least an element of user physiological data. As used in this disclosure, "physiological data" is any data indicative of a person's physiological state; physiological state may be evaluated with regard to one or more measures of health of a person's body, one or more systems within a person's body such as a circulatory system, a digestive system, a nervous system, or the like, one or more organs within a person's body, and/or any other subdivision of a person's body useful for diagnostic or prognostic purposes. For instance, and without limitation, a particular set of biomarkers, test results, and/or biochemical information may be recognized in a given medical field as useful for identifying various disease conditions or prognoses within a relevant field. As a non-limiting example, and without limitation, physiological data describing red blood cells, such as red blood cell count, hemoglobin levels, hematocrit, mean corpuscular volume, mean corpuscular hemoglobin, and/or mean corpuscular hemoglobin concentration may be recognized as useful for identifying various conditions such as dehydration, high testosterone, nutrient deficiencies, kidney dysfunction, chronic inflammation, anemia, and/or blood loss.

With continued reference to FIG. 1, physiological state data may include, without limitation, hematological data, such as red blood cell count, which may include a total number of red blood cells in a person's blood and/or in a blood sample, hemoglobin levels, hematocrit representing a percentage of blood in a person and/or sample that is composed of red blood cells, mean corpuscular volume, which may be an estimate of the average red blood cell size, mean corpuscular hemoglobin, which may measure average weight of hemoglobin per red blood cell, mean corpuscular hemoglobin concentration, which may measure an average concentration of hemoglobin in red blood cells, platelet count, mean platelet volume which may measure the average size of platelets, red blood cell distribution width, which measures variation in red blood cell size, absolute neutrophils, which measures the number of neutrophil white blood cells, absolute quantities of lymphocytes such as B-cells, T-cells, Natural Killer Cells, and the like, absolute numbers of monocytes including macrophage precursors, absolute numbers of eosinophils, and/or absolute counts of basophils. Physiological state data may include, without limitation, immune function data such as Interleukine-6 (IL-6), TNF-alpha, systemic inflammatory cytokines, and the like.

Continuing to refer to FIG. 1, physiological state data may include, without limitation, data describing blood-born lipids, including total cholesterol levels, high-density lipoprotein (HDL) cholesterol levels, low-density lipoprotein (LDL) cholesterol levels, very low-density lipoprotein (VLDL) cholesterol levels, levels of triglycerides, and/or any other quantity of any blood-born lipid or lipid-containing substance. Physiological state data may include measures of glucose metabolism such as fasting glucose levels and/or hemoglobin A1-C (HbA1c) levels. Physiological state data may include, without limitation, one or more measures associated with endocrine function, such as without limitation, quantities of dehydroepiandrosterone (DHEAS), DHEA-Sulfate, quantities of cortisol, ratio of DHEAS to cortisol, quantities of testosterone quantities of estrogen, quantities of growth hormone (GH), insulin-like growth factor 1 (IGF-1), quantities of adipokines such as adiponectin, leptin, and/or ghrelin, quantities of somatostatin, progesterone, or the like. Physiological state data may include measures of estimated glomerular filtration rate (eGFR). Physiological state data may include quantities of C-reactive protein, estradiol, ferritin, folate, homocysteine, prostate-specific Ag, thyroid-stimulating hormone, vitamin D, 25 hydroxy, blood urea nitrogen, creatinine, sodium, potassium, chloride, carbon dioxide, uric acid, albumin, globulin, calcium, phosphorus, alkaline phosphatase, alanine amino transferase, aspartate amino transferase, lactate dehydrogenase (LDH), bilirubin, gamma-glutamyl transferase (GGT), iron, and/or total iron binding capacity (TIBC), or the like. Physiological state data may include antinuclear antibody levels. Physiological state data may include aluminum levels. Physiological state data may include arsenic levels. Physiological state data may include levels of fibrinogen, plasma cystatin C, and/or brain natriuretic peptide.

Continuing to refer to FIG. 1, physiological state data may include measures of lung function such as forced expiratory volume, one second (FEV-1) which measures how much air can be exhaled in one second following a deep inhalation, forced vital capacity (FVC), which measures the volume of air that may be contained in the lungs. Physiological state data may include a measurement blood pressure, including without limitation systolic and diastolic blood pressure. Physiological state data may include a measure of waist circumference. Physiological state data may include body mass index (BMI). Physiological state data may include one or more measures of bone mass and/or density such as dual-energy x-ray absorptiometry. Physiological state data may include one or more measures of muscle mass. Physiological state data may include one or more measures of physical capability such as without limitation measures of grip strength, evaluations of standing balance, evaluations of gait speed, pegboard tests, timed up and go tests, and/or chair rising tests.

Still viewing FIG. 1, physiological state data may include one or more measures of cognitive function, including without limitation Rey auditory verbal learning test results, California verbal learning test results, NIH toolbox picture sequence memory test, Digital symbol coding evaluations, and/or Verbal fluency evaluations. Physiological state data may include one or more evaluations of sensory ability, including measures of audition, vision, olfaction, gustation, vestibular function and pain.

Continuing to refer to FIG. 1, physiological state data may include psychological data. Psychological data may include any data generated using psychological, neuro-psychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from user interactions with persons, documents, and/or computing devices 104; for instance, user patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing module as described in this disclosure.

Still referring to FIG. 1, physiological state data may include genomic data, including deoxyribonucleic acid (DNA) samples and/or sequences, such as without limitation DNA sequences contained in one or more chromosomes in human cells. Genomic data may include, without limitation, ribonucleic acid (RNA) samples and/or sequences, such as samples and/or sequences of messenger RNA (mRNA) or the like taken from human cells. Genetic data may include telomere lengths. Genomic data may include epigenetic data including data describing one or more states of methylation of genetic material. Physiological state data may include proteomic data, which as used herein is data describing all proteins produced and/or modified by an organism, colony of organisms, or system of organisms, and/or a subset thereof. Physiological state data may include data concerning a microbiome of a person, which as used herein includes any data describing any microorganism and/or combination of microorganisms living on or within a person, including without limitation biomarkers, genomic data, proteomic data, and/or any other metabolic or biochemical data useful for analysis of the effect of such microorganisms on other physiological state data of a person, as described in further detail below.

With continuing reference to FIG. 1, physiological state data may include one or more user-entered descriptions of a person's physiological state. One or more user-entered descriptions may include, without limitation, user descriptions of symptoms, which may include without limitation current or past physical, psychological, perceptual, and/or neurological symptoms, user descriptions of current or past physical, emotional, and/or psychological problems and/or concerns, user descriptions of past or current treatments, including therapies, nutritional regimens, exercise regimens, pharmaceuticals or the like, or any other user-entered data that a user may provide to a medical professional when seeking treatment and/or evaluation, and/or in response to medical intake papers, questionnaires, questions from medical professionals, or the like. Physiological state data may include any physiological state data, as described above, describing any multicellular organism living in or on a person including any parasitic and/or symbiotic organisms living in or on the persons; non-limiting examples may include mites, nematodes, flatworms, or the like. Examples of physiological state data described in this disclosure are presented for illustrative purposes only and are not meant to be exhaustive.

With continued reference to FIG. 1, physiological data may include, without limitation any result of any medical test, physiological assessment, cognitive assessment, psychological assessment, or the like. System 100 may receive at least a physiological data from one or more other devices after performance; system 100 may alternatively or additionally perform one or more assessments and/or tests to obtain at least a physiological data, and/or one or more portions thereof, on system 100. For instance, at least physiological data may include or more entries by a user in a form or similar graphical user interface object; one or more entries may include, without limitation, user responses to questions on a psychological, behavioral, personality, or cognitive test. For instance, at least a server may present to user a set of assessment questions designed or intended to evaluate a current state of mind of the user, a current psychological state of the user, a personality trait of the user, or the like; at least a server may provide user-entered responses to such questions directly as at least a physiological data and/or may perform one or more calculations or other algorithms to derive a score or other result of an assessment as specified by one or more testing protocols, such as automated calculation of a Stanford-Binet and/or Wechsler scale for IQ testing, a personality test scoring such as a Myers-Briggs test protocol, or other assessments that may occur to persons skilled in the art upon reviewing the entirety of this disclosure.

With continued reference to FIG. 1, assessment and/or self-assessment data, and/or automated or other assessment results, obtained from a third-party device; third-party device may include, without limitation, a server or other device (not shown) that performs automated cognitive, psychological, behavioral, personality, or other assessments. Third-party device may include a device operated by an informed advisor. An informed advisor may include any medical professional who may assist and/or participate in the medical treatment of a user. An informed advisor may include a medical doctor, nurse, physician assistant, pharmacist, yoga instructor, nutritionist, spiritual healer, meditation teacher, fitness coach, health coach, life coach, and the like.

With continued reference to FIG. 1, physiological data may include data describing one or more test results, including results of mobility tests, stress tests, dexterity tests, endocrine tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

With continued reference to FIG. 1, physiological data may include one or more user body measurements. A "user body measurement" as used in this disclosure, includes a measurable indicator of the severity, absence, and/or presence of a disease state. A "disease state" as used in this disclosure, includes any harmful deviation from the normal structural and/or function state of a human being. A disease state may include any medical condition and may be associated with specific symptoms and signs. A disease state may be classified into different types including infectious diseases, deficiency diseases, hereditary diseases, and/or physiological diseases. For instance and without limitation, internal dysfunction of the immune system may produce a variety of different diseases including immunodeficiency, hypersensitivity, allergies, and/or autoimmune disorders.

With continued reference to FIG. 1, user body measurements may be related to particular dimensions of the human body. A "dimension of the human body" as used in this disclosure, includes one or more functional body systems that are impaired by disease in a human body and/or animal body. Functional body systems may include one or more body systems recognized as attributing to root causes of disease by functional medicine practitioners and experts. A "root cause" as used in this disclosure, includes any chain of causation describing underlying reasons for a particular disease state and/or medical condition instead of focusing solely on symptomatology reversal. Root cause may include chains of causation developed by functional medicine practices that may focus on disease causation and reversal. For instance and without limitation, a medical condition such as diabetes may include a chain of causation that does not include solely impaired sugar metabolism but that also includes impaired hormone systems including insulin resistance, high cortisol, less than optimal thyroid production, and low sex hormones. Diabetes may include further chains of causation that include inflammation, poor diet, delayed food allergies, leaky gut, oxidative stress, damage to cell membranes, and dysbiosis. Dimensions of the human body may include but are not limited to epigenetics, gut-wall, microbiome, nutrients, genetics, and/or metabolism.

With continued reference to FIG. 1, epigenetic, as used herein, includes any user body measurements describing changes to a genome that do not involve corresponding changes in nucleotide sequence. Epigenetic body measurement may include data describing any heritable phenotypic. Phenotype, as used herein, include any observable trait of a user including morphology, physical form, and structure. Phenotype may include a user's biochemical and physiological properties, behavior, and products of behavior. Behavioral phenotypes may include cognitive, personality, and behavior patterns. This may include effects on cellular and physiological phenotypic traits that may occur due to external or environmental factors. For example, DNA methylation and histone modification may alter phenotypic expression of genes without altering underlying DNA sequence. Epigenetic body measurements may include data describing one or more states of methylation of genetic material.

With continued reference to FIG. 1, gut-wall, as used herein, includes the space surrounding the lumen of the gastrointestinal tract that is composed of four layers including the mucosa, submucosa, muscular layer, and serosa. The mucosa contains the gut epithelium that is composed of goblet cells that function to secrete mucus, which aids in lubricating the passage of food throughout the digestive tract. The goblet cells also aid in protecting the intestinal wall from destruction by digestive enzymes. The mucosa includes villi or folds of the mucosa located in the small intestine that increase the surface area of the intestine. The villi contain a lacteal, that is a vessel connected to the lymph system that aids in removal of lipids and tissue fluids. Villi may contain microvilli that increase the surface area over which absorption can take place. The large intestine lack villi and instead a flat surface containing goblet cells are present.

With continued reference to FIG. 1, gut-wall includes the submucosa, which contains nerves, blood vessels, and elastic fibers containing collagen. Elastic fibers contained within the submucosa aid in stretching the gastrointestinal tract with increased capacity while also maintaining the shape of the intestine. Gut-wall includes muscular layer which contains smooth muscle that aids in peristalsis and the movement of digested material out of and along the gut. Gut-wall includes the serosa which is composed of connective tissue and coated in mucus to prevent friction damage from the intestine rubbing against other tissue. Mesenteries are also found in the serosa and suspend the intestine in the abdominal cavity to stop it from being disturbed when a person is physically active.

With continued reference to FIG. 1, gut-wall body measurement may include data describing one or more test results including results of gut-wall function, gut-wall integrity, gut-wall strength, gut-wall absorption, gut-wall permeability, intestinal absorption, gut-wall barrier function, gut-wall absorption of bacteria, gut-wall malabsorption, gut-wall gastrointestinal imbalances and the like.

With continued reference to FIG. 1, gut-wall body measurement may include any data describing blood test results of creatinine levels, lactulose levels, zonulin levels, and mannitol levels. Gut-wall body measurement may include blood test results of specific gut-wall body measurements including d-lactate, endotoxin lipopolysaccharide (LPS) Gut-wall body measurement may include data breath tests measuring lactulose, hydrogen, methane, lactose, and the like. Gut-wall body measurement may include blood test results describing blood chemistry levels of albumin, bilirubin, complete blood count, electrolytes, minerals, sodium, potassium, calcium, glucose, blood clotting factors.

With continued reference to FIG. 1, gut-wall body measurement may include one or more stool test results describing presence or absence of parasites, firmicutes, Bacteroidetes, absorption, inflammation, food sensitivities. Stool test results may describe presence, absence, and/or measurement of acetate, aerobic bacterial cultures, anerobic bacterial cultures, fecal short chain fatty acids, beta-glucuronidase, cholesterol, chymotrypsin, fecal color, *Cryptosporidium* EIA, *Entamoeba histolytica*, fecal lactoferrin, *Giardia lamblia* EIA, long chain fatty acids, meat fibers and vegetable fibers, mucus, occult blood, parasite identification, phospholipids, propionate, putrefactive short chain fatty acids, total fecal fat, triglycerides, yeast culture, n-butyrate, pH and the like.

With continued reference to FIG. 1, gut-wall body measurement may include one or more stool test results describing presence, absence, and/or measurement of microorganisms including bacteria, archaea, fungi, protozoa, algae, viruses, parasites, worms, and the like. Stool test results may contain species such as *Bifidobacterium* species, *campylobacter* species, *Clostridium difficile, Cryptosporidium* species, *Cyclospora cayetanensis, Cryptosporidium* EIA, *Dientamoeba fragilis, Entamoeba histolytica, Escherichia coli, Entamoeba histolytica, Giardia, H. pylori, Candida albicans, Lactobacillus* species, worms, macroscopic worms, mycology, protozoa, Shiga toxin *E. coli*, and the like.

With continued reference to FIG. 1, gut-wall body measurement may include one or more microscopic ova exam results, microscopic parasite exam results, protozoan polymerase chain reaction test results and the like. Gut-wall body measurement may include enzyme-linked immunosorbent assay (ELISA) test results describing immunoglobulin G (Ig G) food antibody results, immunoglobulin E (Ig E) food antibody results, Ig E mold results, IgG spice and herb results. Gut-wall body measurement may include measurements of calprotectin, eosinophil protein x (EPX), stool weight, pancreatic elastase, total urine volume, blood creatinine levels, blood lactulose levels, blood mannitol levels.

With continued reference to FIG. 1, gut-wall body measurement may include one or more elements of data describing one or more procedures examining gut including for example colonoscopy, endoscopy, large and small molecule challenge and subsequent urinary recovery using large molecules such as lactulose, polyethylene glycol-3350, and small molecules such as mannitol, L-rhamnose, polyethyleneglycol-400. Gut-wall body measurement may include data describing one or more images such as x-ray, MRI, CT scan, ultrasound, standard barium follow-through examination, barium enema, barium with contract, MRI fluoroscopy, positron emission tomography 9PET), diffusion-weighted MM imaging, and the like.

With continued reference to FIG. 1, microbiome, as used herein, includes ecological community of commensal, symbiotic, and pathogenic microorganisms that reside on or within any of a number of human tissues and biofluids. For example, human tissues and biofluids may include the skin, mammary glands, placenta, seminal fluid, uterus, vagina, ovarian follicles, lung, saliva, oral mucosa, conjunctiva, biliary, and gastrointestinal tracts. Microbiome may include for example, bacteria, archaea, protists, fungi, and viruses. Microbiome may include commensal organisms that exist within a human being without causing harm or disease. Microbiome may include organisms that are not harmful but rather harm the human when they produce toxic metabolites such as trimethylamine. Microbiome may include pathogenic organisms that cause host damage through virulence factors such as producing toxic by-products. Microbiome may include populations of microbes such as bacteria and yeasts that may inhabit the skin and mucosal surfaces in various parts of the body. Bacteria may include for example Firmicutes species, Bacteroidetes species, Proteobacteria species, Verrumicrobia species, Actinobacteria species, Fusobacteria species, Cyanobacteria species and the like. Archaea may include methanogens such as *Methanobrevibacter* smithies' and *Methanosphaera stadtmanae*. Fungi may include *Candida* species and *Malassezia* species. Viruses may include bacteriophages. Microbiome species may vary in different locations throughout the body. For example, the genitourinary system may contain a high prevalence of *Lactobacillus* species while the gastrointestinal tract may contain a high prevalence of *Bifidobacterium* species while the lung may contain a high prevalence of *Streptococcus* and *Staphylococcus* species.

With continued reference to FIG. 1, microbiome body measurement may include one or more stool test results describing presence, absence, and/or measurement of microorganisms including bacteria, archaea, fungi, protozoa, algae, viruses, parasites, worms, and the like. Stool test results may contain species such as Ackerman's muciniphila, Anaerotruncus colihominis, bacteriology, *Bacteroides vulgates', Bacteroides-Prevotella, Barnesiella* species, *Bifidobacterium longarm, Bifidobacterium* species, *Butyrivbrio crossotus, Clostridium* species, *Collinsella aerofaciens*, fecal color, fecal consistency, *Coprococcus eutactus, Desulfovibrio piger, Escherichia coli, Faecalibacterium prausnitzii*, Fecal occult blood, Firmicutes to Bacteroidetes ratio, *Fusobacterium* species, *Lactobacillus* species, *Methanobrevibacter smithii*, yeast minimum inhibitory concentration, bacteria minimum inhibitory concentration, yeast mycology, fungi mycology, *Odoribacter* species, *Oxalobacter formigenes*, parasitology, *Prevotella* species, *Pseudoflavonifractor* species, *Roseburia* species, *Ruminococcus* species, *Veillonella* species and the like.

With continued reference to FIG. 1, microbiome body measurement may include one or more stool tests results that identify all microorganisms living a user's gut including bacteria, viruses, archaea, yeast, fungi, parasites, and bacteriophages. Microbiome body measurement may include DNA and RNA sequences from live microorganisms that may impact a user's health. Microbiome body measurement may include high resolution of both species and strains of all microorganisms. Microbiome body measurement may include data describing current microbe activity. Microbiome body measurement may include expression of levels of active microbial gene functions. Microbiome body measurement may include descriptions of sources of disease-causing microorganisms, such as viruses found in the gastrointestinal tract such as raspberry bushy swarf virus from consuming contaminated raspberries or Pepino mosaic virus from consuming contaminated tomatoes.

With continued reference to FIG. 1, microbiome body measurement may include one or more blood test results that identify metabolites produced by microorganisms. Metabolites may include for example, indole-3-propionic acid, indole-3-lactic acid, indole-3-acetic acid, tryptophan, serotonin, kynurenine, total indoxyl sulfate, tyrosine, xanthine, 3-methylxanthine, uric acid, and the like.

With continued reference to FIG. 1, microbiome body measurement may include one or more breath test results that identify certain strains of microorganisms that may be present in certain areas of a user's body. This may include for example, lactose intolerance breath tests, methane-based breath tests, hydrogen-based breath tests, fructose-based breath tests, *Helicobacter pylori* breath test, fructose intolerance breath test, bacterial overgrowth syndrome breath tests and the like.

With continued reference to FIG. 1, microbiome body measurement may include one or more urinary analysis results for certain microbial strains present in urine. This may include for example, urinalysis that examines urine specific gravity, urine cytology, urine sodium, urine culture, urinary calcium, urinary hematuria, urinary glucose levels, urinary acidity, urinary protein, urinary nitrites, bilirubin, red blood cell urinalysis, and the like.

With continued reference to FIG. 1, nutrient as used herein, includes any substance required by the human body to function. Nutrients may include carbohydrates, protein, lipids, vitamins, minerals, antioxidants, fatty acids, amino acids, and the like. Nutrients may include for example vitamins such as thiamine, riboflavin, niacin, pantothenic acid, pyridoxine, biotin, folate, cobalamin, Vitamin C, Vitamin A, Vitamin D, Vitamin E, and Vitamin K. Nutrients may include for example minerals such as sodium, chloride, potassium, calcium, phosphorous, magnesium, sulfur, iron, zinc, iodine, selenium, copper, manganese, fluoride, chromium, molybdenum, nickel, aluminum, silicon, vanadium, arsenic, and boron.

With continued reference to FIG. 1, nutrients may include extracellular nutrients that are free floating in blood and exist outside of cells. Extracellular nutrients may be located in serum. Nutrients may include intracellular nutrients which may be absorbed by cells including white blood cells and red blood cells.

With continued reference to FIG. 1, nutrient body measurement may include one or more blood test results that identify extracellular and intracellular levels of nutrients. Nutrient body measurement may include blood test results that identify serum, white blood cell, and red blood cell levels of nutrients. For example, nutrient body measurement may include serum, white blood cell, and red blood cell levels of micronutrients such as Vitamin A, Vitamin B1, Vitamin B2, Vitamin B3, Vitamin B6, Vitamin B12, Vitamin B5, Vitamin C, Vitamin D, Vitamin E, Vitamin K1, Vitamin K2, and folate.

With continued reference to FIG. 1, nutrient body measurement may include one or more blood test results that identify serum, white blood cell and red blood cell levels of nutrients such as calcium, manganese, zinc, copper, chromium, iron, magnesium, copper to zinc ratio, choline, inositol, carnitine, methylmalonic acid (MMA), sodium, potassium, asparagine, glutamine, serine, coenzyme q10, cysteine, alpha lipoic acid, glutathione, selenium, eicosapentaenoic acid (EPA), docosahexaenoic acid (DHA), docosapentaenoic acid (DPA), total omega-3, lauric acid, arachidonic acid, oleic acid, total omega 6, and omega 3 index.

With continued reference to FIG. 1, nutrient body measurement may include one or more salivary test results that identify levels of nutrients including any of the nutrients as described herein. Nutrient body measurement may include hair analysis of levels of nutrients including any of the nutrients as described herein.

With continued reference to FIG. 1, genetic as used herein, includes any inherited trait. Inherited traits may include genetic material contained with DNA including for example, nucleotides. Nucleotides include adenine (A), cytosine (C), guanine (G), and thymine (T). Genetic information may be contained within the specific sequence of an individual's nucleotides and sequence throughout a gene or DNA chain. Genetics may include how a particular genetic sequence may contribute to a tendency to develop a certain disease such as cancer or Alzheimer's disease.

With continued reference to FIG. 1, genetic body measurement may include one or more results from one or more blood tests, hair tests, skin tests, urine, amniotic fluid, buccal swabs and/or tissue test to identify a user's particular sequence of nucleotides, genes, chromosomes, and/or proteins. Genetic body measurement may include tests that example genetic changes that may lead to genetic disorders. Genetic body measurement may detect genetic changes such as deletion of genetic material or pieces of chromosomes that may cause Duchenne Muscular Dystrophy. Genetic body measurement may detect genetic changes such as insertion of genetic material into DNA or a gene such as the BRCA1 gene that is associated with an increased risk of breast and ovarian cancer due to insertion of 2 extra nucleotides. Genetic body measurement may include a genetic change such as a genetic substitution from a piece of genetic material that replaces another as seen with sickle cell anemia where one nucleotide is substituted for another. Genetic body measurement may detect a genetic change such as a duplication when extra genetic material is duplicated one or more times within a person's genome such as with Charcot-Marie Tooth disease type 1. Genetic body measurement may include a genetic change such as an amplification when there is more than a normal number of copies of a gene in a cell such as HER2 amplification in cancer cells. Genetic body measurement may include a genetic change such as a chromosomal translocation when pieces of chromosomes break off and reattach to another chromosome such as with the BCR-ABL1 gene sequence that is formed when pieces of chromosome 9 and chromosome 22 break off and switch places. Genetic body measurement may include a genetic change such as an inversion when one chromosome experiences two breaks and the middle piece is flipped or inverted before reattaching. Genetic body measurement may include a repeat such as when regions of DNA contain a sequence of nucleotides that repeat a number of times such as for example in Huntington's disease or Fragile X syndrome. Genetic body measurement may include a genetic change such as a trisomy when there are three chromosomes instead of the usual pair as seen with Down syndrome with a trisomy of chromosome 21, Edwards syndrome with a trisomy at chromosome 18 or Patau syndrome with a trisomy at chromosome 13. Genetic body measurement may include a genetic change such as monosomy such as when there is an absence of a chromosome instead of a pair, such as in Turner syndrome.

With continued reference to FIG. 1, genetic body measurement may include an analysis of COMT gene that is responsible for producing enzymes that metabolize neurotransmitters. Genetic body measurement may include an analysis of DRD2 gene that produces dopamine receptors in the brain. Genetic body measurement may include an analysis of ADRA2B gene that produces receptors for noradrenaline. Genetic body measurement may include an analysis of 5-HTTLPR gene that produces receptors for serotonin. Genetic body measurement may include an analysis of BDNF gene that produces brain derived neurotrophic factor. Genetic body measurement may include an analysis of 9p21 gene that is associated with cardiovascular disease risk. Genetic body measurement may include an analysis of APOE gene that is involved in the transportation of blood lipids such as cholesterol. Genetic body measurement may include an analysis of NOS3 gene that is involved in producing enzymes involved in regulating vasodilation and vasoconstriction of blood vessels.

With continued reference to FIG. 1, genetic body measurement may include ACE gene that is involved in producing enzymes that regulate blood pressure. Genetic body measurement may include SLCO1B1 gene that directs pharmaceutical compounds such as statins into cells. Genetic body measurement may include FUT2 gene that produces enzymes that aid in absorption of Vitamin B12 from digestive tract. Genetic body measurement may include MTHFR gene that is responsible for producing enzymes that aid in metabolism and utilization of Vitamin B9 or folate. Genetic body measurement may include SHMT1 gene that aids in production and utilization of Vitamin B9 or folate. Genetic body measurement may include MTRR gene that produces enzymes that aid in metabolism and utilization of Vitamin B12. Genetic body measurement may include MTR gene that produces enzymes that aid in metabolism and utilization of Vitamin B12. Genetic body measurement may include FTO gene that aids in feelings of satiety or fullness after eating. Genetic body measurement may include MC4R gene that aids in producing hunger cues and hunger triggers. Genetic body measurement may include APOA2 gene that directs body to produce ApoA2 thereby affecting absorption of saturated fats. Genetic body measurement may include UCP1 gene that aids in controlling metabolic rate and thermoregulation of body. Genetic body measurement may include TCF7L2 gene that regulates insulin secretion. Genetic body measurement may include AMY1 gene that aids in digestion of starchy foods. Genetic body measurement may include MCM6 gene that controls production of lactase enzyme that aids in digesting lactose found in dairy products. Genetic body measurement may include BCMO1 gene that aids in producing enzymes that aid in metabolism and activation of Vitamin A. Genetic body measurement may include SLC23A1 gene that produce and transport Vitamin C. Genetic body measurement may include CYP2R1 gene that produce enzymes involved in production and activation of Vitamin D. Genetic body measurement may include GC gene that produce and transport Vitamin D. Genetic body measurement may include CYP1A2 gene that aid in metabolism and elimination of caffeine. Genetic body measurement may include CYP17A1 gene that produce enzymes that convert progesterone into androgens such as androstenedione, androstenediol, dehydroepiandrosterone, and testosterone.

With continued reference to FIG. 1, genetic body measurement may include CYP19A1 gene that produce enzymes that convert androgens such as androstenedione and testosterone into estrogens including estradiol and estrone. Genetic body measurement may include SRD5A2 gene that aids in production of enzymes that convert testosterone into dihydrotestosterone. Genetic body measurement may include UFT2B17 gene that produces enzymes that metabolize testosterone and dihydrotestosterone. Genetic body measurement may include CYP1A1 gene that produces enzymes that metabolize estrogens into 2 hydroxy-estrogen. Genetic body measurement may include CYP1B1 gene that produces enzymes that metabolize estrogens into 4 hydroxy-estrogen. Genetic body measurement may include CYP3A4 gene that produces enzymes that metabolize estrogen into 16 hydroxy-estrogen. Genetic body measurement may include COMT gene that produces enzymes that metabolize 2 hydroxy-estrogen and 4 hydroxy-estrogen into methoxy estrogen. Genetic body measurement may include GSTT1 gene that produces enzymes that eliminate toxic by-products generated from metabolism of estrogens. Genetic body measurement may include GSTM1 gene that produces enzymes responsible for eliminating harmful by-products generated from metabolism of estrogens. Genetic body measurement may include GSTP1 gene that produces enzymes that eliminate harmful by-products generated from metabolism of estrogens. Genetic body measurement may include SOD2 gene that produces enzymes that eliminate oxidant by-products generated from metabolism of estrogens.

With continued reference to FIG. 1, metabolic, as used herein, includes any process that converts food and nutrition into energy. Metabolic may include biochemical processes that occur within the body. Metabolic body measurement may include blood tests, hair tests, skin tests, amniotic fluid, buccal swabs and/or tissue test to identify a user's metabolism. Metabolic body measurement may include blood tests that examine glucose levels, electrolytes, fluid balance, kidney function, and liver function. Metabolic body measurement may include blood tests that examine calcium levels, albumin, total protein, chloride levels, sodium levels, potassium levels, carbon dioxide levels, bicarbonate levels, blood urea nitrogen, creatinine, alkaline phosphatase, alanine amino transferase, aspartate amino transferase, bilirubin, and the like.

With continued reference to FIG. 1, metabolic body measurement may include one or more blood, saliva, hair, urine, skin, and/or buccal swabs that examine levels of hormones within the body such as 11-hydroxy-androsterone, 11-hydroxy-etiocholanolone, 11-keto-androsterone, 11-keto-etiocholanolone, 16 alpha-hydroxyestrone, 2-hydroxyestrone, 4-hydroxyestrone, 4-methoxyestrone, androstanediol, androsterone, creatinine, DHEA, estradiol, estriol, estrone, etiocholanolone, pregnanediol, pregnanestriol, specific gravity, testosterone, tetrahydrocortisol, tetrahydrocrotisone, tetrahydrodeoxycortisol, allo-tetrahydrocortisol.

With continued reference to FIG. 1, metabolic body measurement may include one or more metabolic rate test results such as breath tests that may analyze a user's resting metabolic rate or number of calories that a user's body burns each day rest. Metabolic body measurement may include one or more vital signs including blood pressure, breathing rate, pulse rate, temperature, and the like. Metabolic body measurement may include blood tests such as a lipid panel such as low density lipoprotein (LDL), high density lipoprotein (HDL), triglycerides, total cholesterol, ratios of lipid levels such as total cholesterol to HDL ratio, insulin sensitivity test, fasting glucose test, Hemoglobin A1C test, adipokines such as leptin and adiponectin, neuropeptides such as ghrelin, pro-inflammatory cytokines such as interleukin 6 or tumor necrosis factor alpha, anti-inflammatory cytokines such as interleukin 10, markers of antioxidant status such as oxidized low-density lipoprotein, uric acid, paraoxonase 1. Persons skilled in the art, upon reviewing the entirety of this disclosure, will be aware of various additional examples of physiological state data that may be used consistently with descriptions of systems and methods as provided in this disclosure.

With continued reference to FIG. 1, physiological data may be obtained from a physically extracted sample. A "physical sample" as used in this example, may include any sample obtained from a human body of a user. A physical sample may be obtained from a bodily fluid and/or tissue analysis such as a blood sample, tissue, sample, buccal swab, mucous sample, stool sample, hair sample, fingernail sample and the like. A physical sample may be obtained from a device in contact with a human body of a user such as a microchip embedded in a user's skin, a sensor in contact with a user's skin, a sensor located on a user's tooth, and the like. Physiological data may be obtained from a physically extracted sample. A physical sample may include a signal from a sensor configured to detect physiological data of a user and record physiological data as a function of the signal. A sensor may include any medical sensor and/or medical device configured to capture sensor data concerning a patient, including any scanning, radiological and/or imaging device such as without limitation x-ray equipment, computer assisted tomography (CAT) scan equipment, positron emission tomography (PET) scan equipment, any form of magnetic resonance imagery (MRI) equipment, ultrasound equipment, optical scanning equipment such as photo-plethysmographic equipment, or the like. A sensor may include any electromagnetic sensor, including without limitation electroencephalographic sensors, magnetoencephalographic sensors, electrocardiographic sensors, electromyographic sensors, or the like. A sensor may include a temperature sensor. A sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. A sensor may detect any hematological parameter including blood oxygen level, pulse rate, heart rate, pulse rhythm, blood sugar, and/or blood pressure. A sensor may be configured to detect internal and/or external biomarkers and/or readings. A sensor may be a part of system 100 or may be a separate device in communication with system 100. User data may include a profile, such as a psychological profile, generated using previous item selections by the user; profile may include, without limitation, a set of actions and/or navigational actions performed as described in further detail below, which may be combined with biological extraction data and/or other user data for processes such as classification to user sets as described in further detail below.

Still referring to FIG. 1, computing device 104 is configured to receive an item descriptor 112 from a user. As used in this disclosure, an "item descriptor 112" is an element of data usable to select an item such as a define item descriptor 112: a category, a UPC code, a name of an item, a generic description of an item such as a general retail product. A general retail product may include any item available for retail sale whether online or in person. A general retail product may include for example an article of clothing, an electronic device, homeware, linens, furniture, toys, games, and the like. A general retail product may include for example any item available for sale on websites that may include without limitation online electronic marketplaces. In an embodiment, item descriptor 112 may include an item selection. An "item selection," as used in this disclosure, is an identification of a specific item; an item selection may include an identification of any retail product available for sale, including a product name, a serial number, a picture and/or scan of a universal product code (UPC) that uniquely identifies a particular general retail product, and/or any other element of data defining a specific retail product. Item descriptor 112 may include an item category identifier. An "item category identifier" may be an identifier of one or more categories to which an item may belong; non-limiting examples may include clothing, outerwear, books, fiction, fantasy novels, electronics, camping gear, or the like. Item category descriptors may describe nesting and/or overlapping categories, such that a given item selection may be included in various different item descriptors 112.

Further referring to FIG. 1, item descriptor 112 may include a textual word and/or phrase, such as an item descriptor 112 that a person might enter on a graphical user interface or other facility provided for interaction with an electronic marketplace, website, mobile application, native application, desktop application, or the like. Computing device 104 may parse a textual word or phrase to generate one or more keywords, where keywords may include single words and/or phrases of two or more words. Computing device 104 may, for instance, tokenize a textual word or phrase to separate the textual word or phrase into individual words. Computing device 104 may filter out "stop words" that do not convey meaning, such as "of," "a," "an," "the," or the like. Computing device 104 may use words parsed from item descriptor 112 directly as keywords for retrieval from a database, index, or other datastore. Alternatively or additionally, Computing device 104 may generate phrases to use as keywords and/or map one or more words or phrases from a textual word or phrase to a keyword query for retrieval from a database, index, or other datastore using a language processing module. Language processing module may include any hardware and/or software module. Language processing module may be configured to extract, from the one or more documents, one or more words. One or more words may include, without limitation, strings of one or characters, including without limitation any sequence or sequences of letters, numbers, punctuation, diacritic marks, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams" where all sequences of n consecutive characters are considered. Any or all possible sequences of tokens or words may be stored as "chains", for example for use as a Markov chain or Hidden Markov Model.

Still referring to FIG. 1, a language processing module may operate to produce a language processing model. Language processing model may include a program automatically generated by computing device 104 and/or language processing module to produce associations between one or more words extracted from at least a document and detect associations, including without limitation mathematical associations, between such words, and/or associations of extracted words with categories of physiological data, relationships of such categories to prognostic labels, and/or categories of prognostic labels. Associations between language elements, where language elements include for purposes herein extracted words, categories of physiological data, relationships of such categories to prognostic labels, and/or categories of prognostic labels may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of physiological data, a given relationship of such categories to prognostic labels, and/or a given category of prognostic labels. As a further example, statistical correlations and/or mathematical associations may include probabilistic formulas or relationships indicating a positive and/or negative association between at least an extracted word and/or a given category of physiological data, a given relationship of such categories to prognostic labels, and/or a given category of prognostic labels; positive or negative indication may include an indication that a given document is or is not indicating a category of physiological data, relationship of such category to prognostic labels, and/or category of prognostic labels is or is not significant.

With continued reference to FIG. 1, language processing module and/or computing device 104 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and language processing module and/or computing device 104 may then use such associations to analyze words extracted from one or more documents and determine relationships between such words. Corpus of documents may include any set of documents, such as a plurality of web pages, textual conversation logs, articles, blog posts, excerpts from and/or electronic texts of books or the like. Alternatively or additionally, language processing module may generate a model using correlations between words and/or phrases compiled by a third party, such as the n-grams database provided by Alphabet, Inc. of Mountain View, Calif.

With continued reference to FIG. 1, a textual word or phrase entry may be performed by offering an entry field to a user in a graphical user interface (GUI), which may be provided to a display of a user device. GUI may offer user options such as date ranges, content categories such as videos, images, general content, news, shopping, maps, and the like. GUI may provide one or more options for forms of search; for instance, GUI may provide natural language searching, which may utilize a language processing module as described above to process sentences or phrases entered by a user in a manner similar to a conversational question. GUI may provide an option to enter a Boolean search; in other words, computing device 104 may parse a textual word or phrase providing item descriptor 112 for Boolean operators such as AND, OR, NOT and the like, and apply logic of such operators to search results using program commands implementing Boolean logic. GUI may be used to offer proximity search, where a distance between keywords from query in content at result URLs is used as a ranking or selection criterion thereof; alternatively or additionally, searching for an exact phrase and/or synonymous or closely related phrases may be performed using, without limitation, language processing modules and/or language processing models such as vector spaces, effectively adding proximity between keywords and/or synonyms thereof to criteria for finding and/or ranking search results.

Still referring to FIG. 1, computing device 104 is configured to generate, using a classification algorithm and a plurality of elements of user data, a user classifier 116 matching user data to user sets. Plurality of elements of user data may include data of user. Plurality of elements of user data may include data associated with other users; such data may include any user data as described above. Plurality of elements of user data may include a plurality of past extractions, where "past extractions" are defined as biological extractions taken for user and/or other users prior to use to generate user classifier 116. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. User classifier 116 may be configured to output user set identifiers, where a "user set identifier" is a datum that labels or otherwise identifies a user set; that is, a label identifying a set of users that have sets of user data, such as without limitation biological extractions, that are clustered together, found to be close under a distance metric as described below, or the like. A user set may be a collection of users having closely related user data. User classifier 116 may include a classifier configured to input user data and output user set identifiers; user classifier 116 may include a classifier configured to input biological extractions and output user set identifiers.

Computing device 104 and/or another device may generate user classifier 116 using a classification algorithm, defined as a processes whereby a computing device 104 derives a classifier from user classification training data 120. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, plurality of elements of user data may be utilized by classification algorithms as or in training data. Training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

Still referring to FIG. 1, training data used to generate user classifier 116 may include, without limitation, a plurality of data entries, each data entry including one or more elements of user data such as biological extractions, and one or more correlated user set identifiers, where user set identifiers and associated user data profiles may be identified using feature learning algorithms as described below. Index training data and/or elements thereof may be added to, as a non-limiting example, by classification of multiple users' data to user set identifiers using one or more classification algorithms.

Still referring to FIG. 1, computing device 104 may be configured to generate user classifier 116 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate user classifier 116 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a media item, such as spoken or written text, objects depicted in images, metadata, or the like, to clusters representing themes.

In an embodiment, and still referring to FIG. 1, computing device 104 may test user classifier 116 using patterns that are different from those used to train the classifier. By evaluating user classifier 116 using one or more patterns that are different from the patterns that were used to train the classifier, i.e., by training and evaluating the classifier using different sets of patterns, a more accurate and relevant measure of the classifier's performance may be obtained. A separate and distinct set of patterns for evaluating the classifier's performance may be reserved for the purposes of periodically monitoring the training progress. Once user classifier 116 is able to identify items with which the patterns of interactions in the second group or set are associated, to a predetermined degree, tolerance or confidence level, the classifier may be deemed sufficiently trained and able to identify items which may be recommended, or should not be recommended, to a customer based on his or her interactions with one or more web sites.

In an embodiment, and still referring to FIG. 1, computing device 104, and/or a device generating user classifier 116, may generate new user set identifiers using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of physiological data, as defined above, with each other. As a non-limiting example, feature learning algorithm may detect co-occurrences of gene combinations, as defined above, with each other. Computing device 104 may perform a feature learning algorithm by dividing physiological data from a given person into various sub-combinations of such data to create physiological data sets as described above, and evaluate which physiological data sets tend to co-occur with which other physiological data sets; for instance, where physiological state data includes genetic sequences, computing device 104 may divide each genetic sequence into individual genes and evaluate which individual genes and/or combinations thereof tend to co-occur with which other individual genes, and/or other physiological data. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified user data, such as without limitation biological extraction data, and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related user data, such as without limitation biological extraction data, which may be provided with user set identifiers; this may, for instance, generate an initial set of user set identifiers from an initial set of user physiological data of a large number of users, and may also, upon subsequent iterations, identify new clusters to be provided new user set identifiers, to which additional user data, such as biological extraction data, may be classified, or to which previously used user data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \ni C} \mathrm{dist}(ci, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci=1/|Si|\Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected data set. Degree of similarity index value may indicate how close an element or set of elements of user data is to being classified by k-means algorithm to a particular cluster. K-means clustering algorithm may evaluate the distances of user data to the k-number of clusters output by k-means clustering algorithm. Short distances between a set of user data and a cluster may indicate a higher degree of similarity between the set of user data and a particular cluster. Longer distances between a set of user data and a cluster may indicate a lower degree of similarity between a user data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between user data and the data cluster. Alternatively or additionally k-means clustering algorithm may select a plurality of clusters having low degree of similarity index values to user data sets, indicative of greater degrees of similarity. Degree of similarity index values may be compared to a threshold number indicating a minimal degree of relatedness suitable for inclusion of a set of user data in a cluster, where degree of similarity indices falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

In an embodiment, and still referring to FIG. 1, computing device 104 and/or another device in communication therewith may generate an initial set of user set identifiers using an initial feature learning algorithm; for instance, an initial estimate number k of user set identifiers may be created, and feature learning algorithm may be performed to generate k clusters. This may be followed by performance of a classification algorithm; where a threshold number of user data sets does not converge within a threshold distance of any cluster according to the classification algorithm, device performing these processes may increment k by one or more integer values and perform feature learning algorithm a second time; this may be repeated until a threshold proportion of population of user data sets converges within a threshold distance of clusters under classification algorithm.

Figure 2:
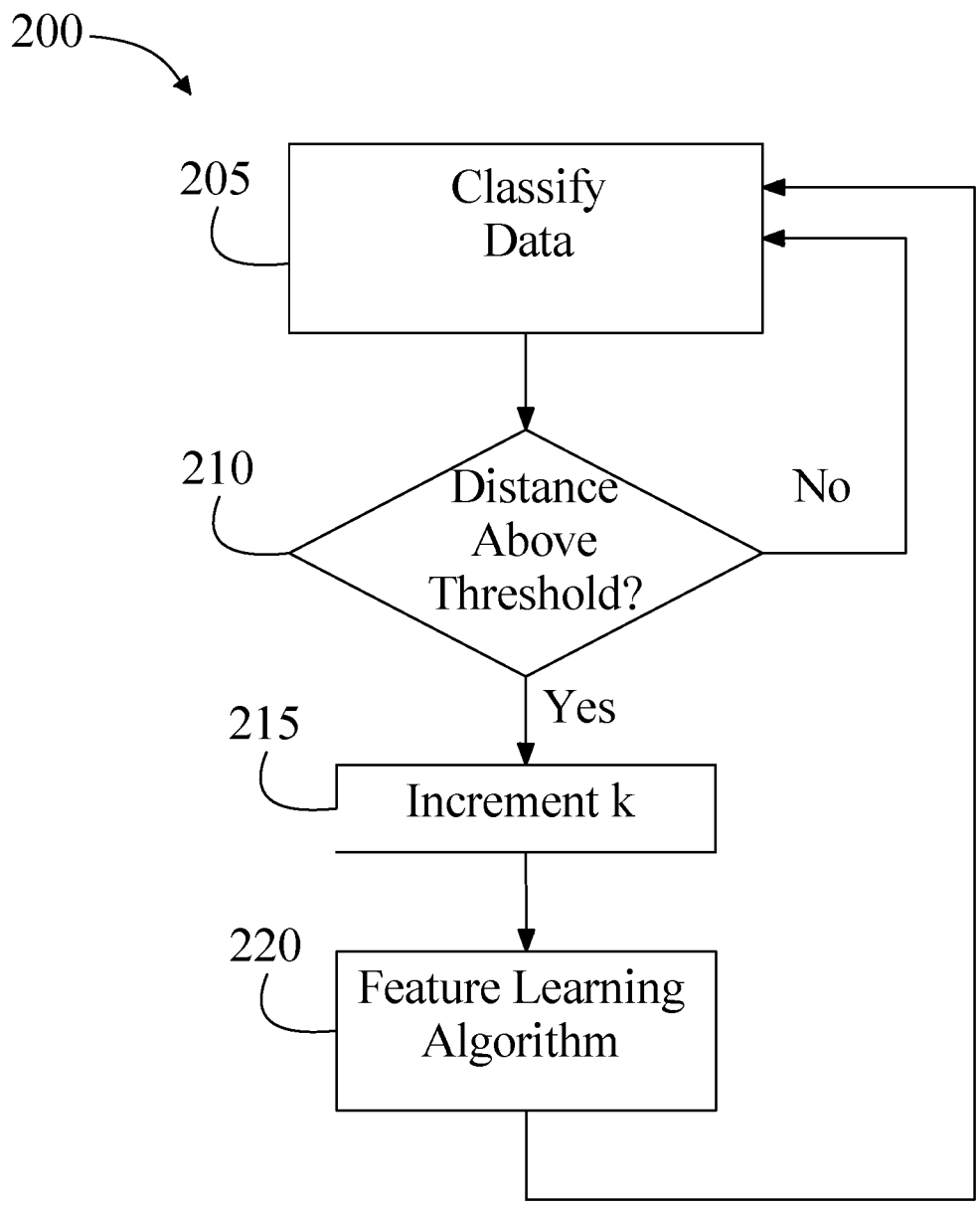
FIG. 2 is a logic flow diagram illustrating an exemplary embodiment of a process for generation of new labels.

Referring to FIG. 2, computing device 104 and/or other device may follow a process for creation of new user set identifiers, either initially or when user classifier 116 is being run against newly submitted biological extractions. At step 205, computing device 104 and/or other device may perform classification of one or more elements of user data, such as without limitation biological extractions as described above. At step 210, computing device 104 and/or other device may record degree of convergence with existing clusters of each such element of user data; if distances, such as average distances from user set identifier clusters, are below a threshold level, process may return to classification with current user set identifiers, for instance using new user data and/or biological extractions or the like. Where a threshold population fails to converge within a threshold distance of existing clusters, k may be incremented at step 215 and feature learning algorithm may be run at step to generate one or more new user set identifiers, to which user data sets may be classified by running classification algorithm to generate an updated user classifier 116. Process may then return to classification 205 and repeat determinations; k may be incremented, and feature learning performed, repeatedly, until convergence brings distances below a desired and/or recorded threshold level. System 100 may ensure by such a process that classification algorithm identifies user set identifiers closely related to a user; this may help to ensure that search results are closely tailored to a user based on biological extraction and/or other user data.

Referring again to FIG. 1, computing device 104 may be configured to output, from the user classifier 116, a user set identifier. User classifier 116 may classify biological extraction and/or other user data to a user set identifier using a classification algorithm as described above, for instance by identifying a user set identifier associated with a cluster of data sets having a greatest degree of similarity to biological extraction. In an embodiment, computing device 104 may include additional data associated with user, such as without limitation physiological data received in past biological extractions from user. Physiological data and/or other data of each user may be stored, without limitation, in a user database 124. User database 124 may include any data structure for ordered storage and retrieval of data, which may be implemented as a hardware or software module. A user database 124 may be implemented, without limitation, as a relational database, a key-value retrieval datastore such as a NOSQL database, or any other format or structure for use as a datastore that a person skilled in the art would recognize as suitable upon review of the entirety of this disclosure. A user database 124 may include a plurality of data entries and/or records corresponding to user tests as described above. Data entries in a user database 124 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a user database 124 may reflect categories, cohorts, and/or populations of data consistently with this disclosure. User database 124 may be located in memory of computing device 104 and/or on another device in and/or in communication with system 100.

Figure 3:
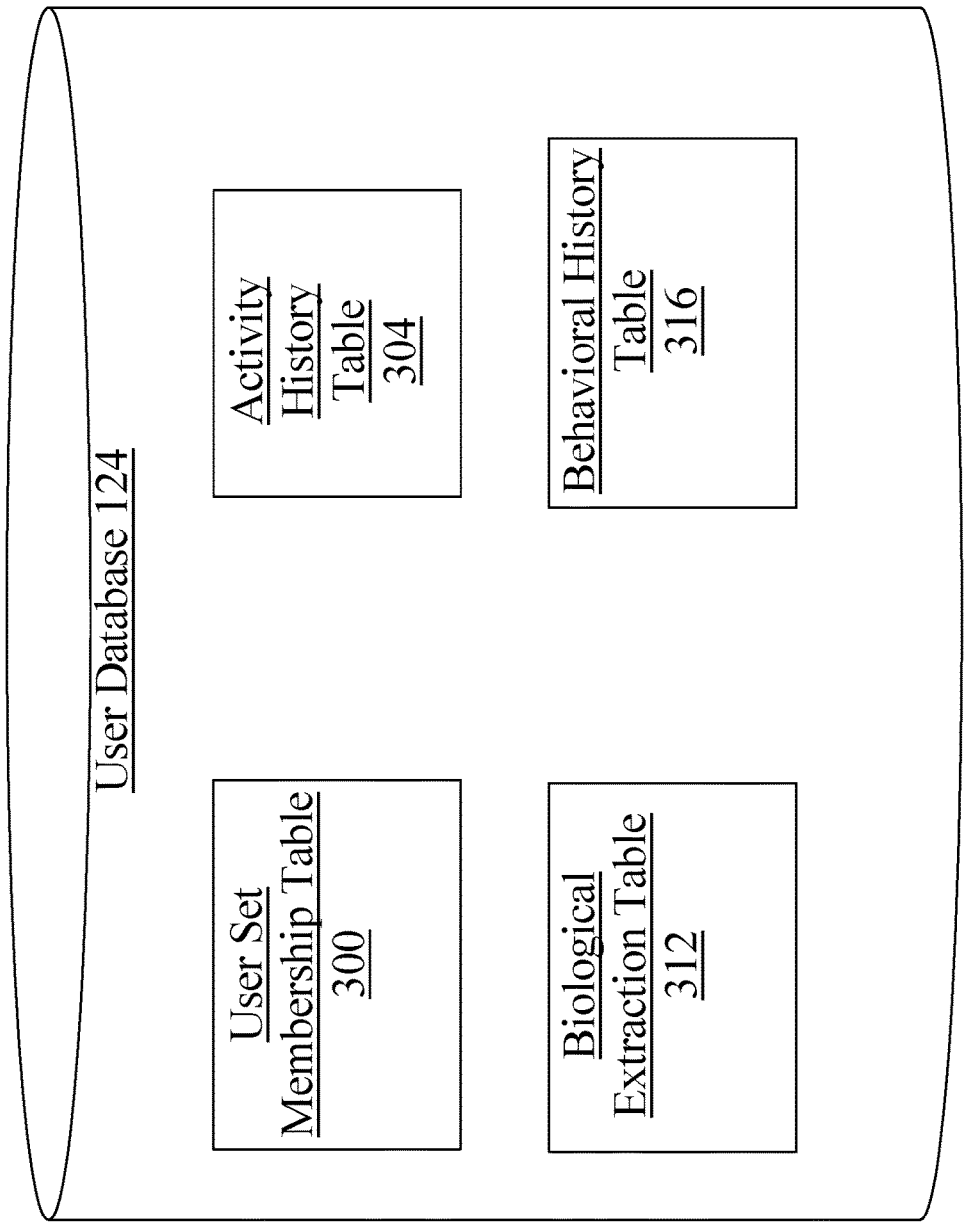
FIG. 3 is a block diagram illustrating an exemplary embodiment of a user database.

Referring now to FIG. 3, an exemplary embodiment of a user database 124 is illustrated. One or more tables in user database 124 may include, without limitation, a user set membership table 300, which may be used to store identities of user set identifiers to which users are currently classified according to biological extraction and/or user data classification as described above. One or more tables in user database 124 may include, without limitation, an activity history table 304, which may be used to store history of activity such as past item selections; history may be recorded per user and/or per user set. One or more tables in user database 124 may include, without limitation, a biological extraction table 308, which may be used to store biological extraction data. User database 124 may include a behavioral history table, where current or past reports or information indicative of user behavior, including without limitation problematic behaviors, may be stored; behavioral history table may store, as a non-limiting example, records of reports received from user and/or other persons and/or devices indicating engagement in one or more problematic behaviors as described in this disclosure. Persons skilled in the art, upon reviewing the entirety of this disclosure, will be aware of various alternative or additional data which may be stored in user database 124, including without limitation any data concerning any user activity, demographics, profile information, viewing and/or media consumption history, or the like.

Referring again to FIG. 1, computing device 104 may be configured to produce a selection guidance 128 using user set identifier and item category identifier. A "selection guidance," as used in this disclosure, is at least an item selection generated by computing device 104 to be presented to the user as a potential item the user may select; for instance, selection guidance may include a link, serial number, image, or other datum permitting identification of item associated with item, which may be, as a non-limiting example, a product for sale. Computing device 104 may be configured to produce the selection guidance 128 by identifying at least an action associated with the item descriptor 112; computing device 104 may determine at least a selection associated with the at least an action and producing the selection guidance 128 using the at least a selection. At least an action may include any interaction with a user interface as described herein, including entry of a query, a selection of a link, button, or the like, or any other user activity that may trigger an event handler or otherwise cause an exchange of data to take place. For instance, a user interacting with an online marketplace may perform one or more interactions during prior to, or after providing item descriptor 112, including interactions with one or more web pages associated with the online marketplace, including web pages that are intrinsic to the online marketplace or web pages that may be hosted externally, such by searching for items through the entry of any number of keywords into a search engine, or browsing for items that have been designated and sorted into any number of categories. Various such interactions, for instance and without limitation a set of interactions performed during a particular session, may be aggregated into one or more navigational patterns, which may include sequences of pages, types of pages, and/or other material and/or fields that may be visited and/or utilized by a user when visiting interacting with a user interface such as an online marketplace. In an embodiment, a navigational pattern may be defined as a vector, for instance and without limitation as described above, having elements including identifiers of such pages and/or other elements, and an order or sequence in which such pages and/or elements were accessed. Additionally, a navigational pattern, or a vector representing such a pattern (i.e., a navigational vector), may include further information or data regarding the respective interactions, orders or sequences in accordance with the present disclosure. Additional elements that may be included in a navigational pattern and/or vector include, without limitation, a time at which a web page or element was displayed, a duration for which the web page or element remained an area or portion of a web page that is selected, clicked or viewed, and/or information defining an item or a category of items associated with such interactions, such as a name or title of the item, a category or group with which the item is associated, a keyword entered into a search engine which originated a search for the item, or an icon, set of text or image corresponding to an item and/or category thereof.

Still referring to FIG. 1, at least an action, a navigational pattern, and/or vector may be identified as having been performed by other users classified to user set as described above. Such identification may be performed, without limitation, by recording actions, navigational patterns, and/or vectors associated therewith for multiple users in user set. Computing device 104 may perform one or more analytical processes on such, navigational patterns, and/or vectors, including without limitation classification as described above. For instance, and without limitation, computing device 104 may use a classification algorithm to generate a user action classifier 132, which may classify a user actions, navigation patterns, and/or vectors to subsequent and/or additional actions, navigation patterns, and/or vectors in data describing user set actions, including selection of additional and/or alternative items, purchases, reviews, or the like; such outputs may be used to generate and/or display to user one or more such subsequent and/or additional actions, and/or to display items, item categories, item selections, and/or item descriptors 112 that are objects and/or subjects of such subsequent and/or additional actions. As a result, user may be provided with one or more recommended alternatives and/or additions to an item a user is considering selecting, for example based on choices users having similar user data, such as biological extraction data, to user may have made in item selection, purchase, or the like.

As a non-limiting example, and still referring to FIG. 1, user action classifier 132 may be trained to recognize when a pattern is, or is not, followed by a purchase of an item, or when a pattern is associated with any other type or form of activity regarding an item. Efficacy of the classifier may be determined using any statistical or mathematical tool, including a loss function such as a sum of squares of errors, residual sum of square, and/or sum of absolute errors. For instance, given a plurality of navigation patterns and/or vectors associated therewith, a conditional probability of a purchase of an item for each of the navigational patterns may be determined. End results of each of the navigational patterns may be identified, and the respective probabilities of the purchases of items following each navigational pattern may be determined by any means or method. For example, the conditional probabilities of each of the interactions in a navigational pattern that resulted in the purchase of an item may be used to determine the conditional probability of the purchase of the item following the navigational pattern. Alternatively, Bayes' Theorem may be used to calculate the respective conditional probabilities. A group of navigational patterns having conditional probabilities of purchases of items above a predetermined threshold may be identified. Such a threshold may be used to distinguish statistically meaningless navigational patterns that result in the purchase of at least one item (e.g., noise) from those patterns that result with a discernible regularity and also result in the purchase of at least one item, and may be defined on any basis; threshold probabilities may be computed, without limitation, as described below. User action classifier 132 may, in a non-limiting example, be trained using navigational patterns in a group as inputs and items that were respectively selected and/or purchased following such patterns purchased as outputs. For example, a plurality of vectors representative of navigational patterns in a group may be provided as a training set to a classifier, and the classifier may be trained to assign a label, in the form of the associated item, to the vector.

With continued reference to FIG. 1, computing device 104 may alternatively or additionally generate guidance using a user action database, which may be any database suitable for use as a user database 124. For instance, and without limitation, a plurality of associations between navigation patterns and/or vectors and item descriptors 112 and/or item selections may be stored in user action database; navigation patterns may be looked up in database using a user action, navigation pattern, and/or vector associated with a navigation pattern as a query to retrieve item descriptors 112 and/or item selections stored in user action database. For example, interactions, navigational pattern, and/or vectors associated therewith may be compared to historically observed navigational patterns which resulted in the purchase of items in accordance with one or more optimization techniques, in order to identify any commonalities therewith. A classifier, including any classifier as described above, may be used to populate user action database, for instance by identifying associations between patterns and/or vectors and item descriptors 112 and/or item selections and storing such associations in user action database.

With continued reference to FIG. 1, computing device 104 may be configured to prepare training data for user action classifier 132 by identifying useful and/or relevant data and/or discarding data that is not useful and/or relevant for training user action classifier 132. For instance, and without limitation, if a of historical navigational patterns which resulted in purchases has been identified, such patterns may be statistically sorted or ranked in order to determine which patterns had the highest degrees or levels of confidence or likelihood of purchase associated therewith, such as by generating a histogram indicative of the frequency of purchases of items with respect to one or more historical navigational patterns, or by determining conditional probabilities of such purchases for each of the historical navigational patterns. Sorting or ranking such patterns may determine which purchases of items were made on a random or anomalous basis, and which purchases of items were made in accordance with consistent, recognizable sequences of specific interactions or types of interactions. A histogram of frequencies of navigational patterns and the items purchased following each of the navigational patterns in descending order may be generated. For example, each navigational pattern may be uniquely identified and sorted or ranked based on the number of instances in which a specific item was purchased following such navigational patterns. Interactions of each of the navigational patterns may be referenced with any degree of specificity (i.e., an interaction may refer to the performance of a search from a gateway page, or the performance of a search of a specific item), and each of the navigational patterns may be likewise associated with one or more items on a general or specific basis (i.e., where a navigational pattern results in a purchase of an item, the pattern may be associated with a mere purchase of an item, a purchase of the specific item, or a purchase of an item in the category of the specific item). A subset of the navigational patterns having frequencies in excess of a threshold may be identified. For instance, a group of the navigational patterns that results in the purchase of any item, of a particular item, or of an item in a specific category at least eighty-five percent of the time, or any other share or expression of a confidence level, may be identified; associations exceeding the threshold may be stored in user action database and/or used in training data. In an embodiment, a score, such as a numerical score indicating a probability a navigational pattern will result in the purchase of a specific item may be calculated; score may be compared to a threshold as described above.

Still referring to FIG. 1, computing device 104 may be configured to rank selection guidance 128 according to at least a selection criterion; for instance, where selection guidance 128 lists a plurality of item selections, computing device 104 may present the plurality of item selections to a user according to a rank order, present only item selections above a threshold level of ranking, and/or present some number of highest-ranked item selections. In an embodiment, rank order and/or selection criterion may be an order established by a process of generating selection guidance 128; for instance, selection guidance 128 may indicate a probability of a match for each item selection of a plurality of item selections to a likely selection desired by user, which probability may be used to rank item selections. Alternatively or additionally, computing device 104 may rank item selections according to cost, an average rating provided by users such as a "star" rating, a numerical popularity rating, or the like.

Alternatively or additionally, and still referring to FIG. 1, computing device 104 may rank item selections in selection guidance 128 according to a combination of two or more factors. For instance, and without limitation, ranking may be performed using a loss function. A "loss function" as used herein is an expression of an output of a mathematical expression which an optimization algorithm minimizes to generate an optimal result. As a non-limiting example, computing device 104 may select an item selection having an associated vector of attributes, which may be any attributes suitable for ranking as described above, that minimizes a measure of difference from a vector of ideal values for the plurality of attributes; measure of difference may include, without limitation, a measure of geometric divergence between vectors such as without limitation cosine similarity and/or any distance metric used as described above in clustering, feature learning, and/or classification algorithms, or may include any suitable error function measuring any degree of divergence and/or aggregation of degrees of divergence, between attributes of vectors. Selection of different loss functions may result in different rankings. Alternatively or additionally, each vector as described above may be represented by a mathematical expression having the same form as mathematical expression; computing device 104 may compare the former to the latter using an error function representing average difference between the two mathematical expressions. Error function may, as a non-limiting example, be calculated using the average difference between coefficients corresponding to each variable. A vector having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers.

Still referring to FIG. 1, a vector of ideal or optimal attributes may be created by having user provide entries indicative of relative importance of each attribute of a plurality of attributes. In an embodiment, and still referring to FIG. 1, computing device 104 may be configured to present selection guidance 128 according to a given ranking to user. In an embodiment, computing device 104 may receive user input selecting a different ranking criterion and/or modifying a vector of ideal attributes. for instance as described above; computing device 104 may repeat above-described processes for selection of one or more item selections, including any loss-function process, and display selection guidance 128 a second time. computing device 104 is configured to provide the selection guidance 128 to the user.

In an embodiment, and still referring to FIG. 1, computing device 104 may be configured to perform a selection suitability determination for item descriptor 112 and/or an item selection. In an embodiment a selection suitability determination is a process that indicates a degree to which an item selection is suitable for user given biological extraction. Selection determination may output a binary or "true/false" answer that either indicates that an item selection is suitable, or that the item selection is not suitable. Alternatively or additionally, selection determination may include a numerical quantity indicative of a degree of suitability, which may be used to modify and/or produce a ranking of selection guidance 128 as described above or may be presented to user in conjunction with each item selection.

In an embodiment, and with continued reference to FIG. 1, computing device 104 may be further configured to generate at least a machine-learning model, which may be referred to herein as a suitability model 136, that generates selection suitability determinations using a biological extraction and generate a selection suitability determination for item descriptor 112 and/or item selection using the at least a machine-learning model. Suitability model 136 may be produced using a machine-learning process. A machine-learning process is a process that automatedly uses a training data as described above to generate an algorithm that will be performed by a computing device 104/module to produce outputs given data provided as inputs; this is in contrast to a non-machine learning software program where the commands to be executed are determined in advance by a user and written in a programming language.

Still referring to FIG. 1, computing device 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

With continued reference to FIG. 1, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include item selections, lists of attributes of items, or the like as described above as inputs, and a determination that an item is or is not suitable and/or a score indicating a degree of suitability as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs. Supervised machine-learning processes may include classification algorithms, defined as processes whereby a computing device 104 derives, from training data, a model for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers Still referring to FIG. 1, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 1, machine-learning processes as described in this disclosure may be used to generate machine-learning models. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Alternatively or additionally, and still referring to FIG. 1, computing device 104 may generate suitability determination using a lazy-learning process. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

In an embodiment, and still referring to FIG. 1, machine-learning process and/or model may output a suitability score from inputs including biological extraction, and/or user data, combined with product attributes, and outputs a suitability score. Training data used in machine learning processes may link products and/or attributes thereof, in combination with biological extraction and/or other user data, with a suitability score output, which may be seeded by user inputs, which may be provided by experts; machine-learning process may perform a process such as regression or the like to generate a mathematical formula for calculating suitability scores. In operation, computing device 104 may receive an item selection and/or set of data describing an item, generate a plurality of item attributes, for instance from a data store listing specifications and/or product details, and input the item attributes to a machine learning model and/or process; a resulting suitability score may be compared to a threshold to determine that the item is or is not suitable.

Alternatively or additionally, and continuing to refer to FIG. 1, computing device 104 may be configured to generate a model that determines a degree of association between an item, item descriptor 112, and/or item selection and a negative behavioral propensity. A "negative behavioral propensity," as used in this disclosure, is an elevated risk of developing a negative behavior, where a "negative behavior," also referred to herein as a "problematic behavior," is defined as an addictive or self-injurious behavior. A negative behavior may include, without limitation, an addition to a chemical substance, such as an addiction to narcotics, stimulants such as cocaine, cocaine derivatives, amphetamines, methamphetamine, nicotine, or the like, opiates such as heroine, fentanyl, oxycodone, or the like, cannabis, cannabis-derived compounds such as THC, depressants such as alcohol, barbiturates, benzodiazepines, or the like, MDMA, PCP, hallucinogens such as LSD, addictions to any of various prescription drugs, or the like. As a further non-limiting example, a negative behavior may include an addition to an act, such as a gambling addition, a sex addiction characterized by compulsive engagement in sexual activity, a pornography addiction characterized by compulsive sexual activity concurrent with pornography consumption, gaming disorder characterized by compulsive use of Internet or video games, gambling addiction and/or problem gambling as characterized by compulsive or continuous gambling despite resulting financial harm, food addiction as characterized by compulsive overeating, an eating disorder such as anorexia or bulimia, or the like.

Still referring to FIG. 1, computing device 104 may receive an identification of a problematic behavior and/or negative behavioral propensity from a device operated by user; for instance, user may provide the input after a lapse in self-control. Alternatively or additionally, another person, potentially from a different remote device, may report that user has engaged in the problematic behavior. For instance, a family member, neighbor, spouse, boyfriend, girlfriend, ex-boyfriend, ex-girlfriend, religious leader, co-worker, or the like may observe user engaging in problematic behavior, such as a drinking binge, a visit to an adult entertainment institution, an excessive shopping spree, weekend at a casino, a hit of an addictive drug, or the like. Computing device 104 may track such notifications and/or compare such notifications to negative behavioral propensities. For instance, computing device 104 may record a first such report as indicative that user is at an elevated risk to engage in problematic behavior. In an embodiment, one or more words and/or phrases entered by a user, who may include any user as described above, may be mapped to a label, or particular word or phrase used by computing device 104 to describe an object, behavior, problematic behavior, negative behavioral tendency, or the like, using a language processing model, module, and/or algorithm as described below; for instance, computing device 104 may determine using a language processing model, module, and/or algorithm as described below that the word or phrase entered by the user is a synonym of the label, and may substitute the label for the word or phrase. User entries may alternatively or additionally include a media item, as defined in further detail below, such as a media item a user reports to have been watched, listened to, or otherwise consumed by user; media item may, without limitation, be associated with objects contained therein using object classifiers as described in further detail below, outputs of which computing device 104 may treat in a like manner to user-input words, phrases, and/or identifications.

With continued reference to FIG. 1, user entry may directly identify a problematic behavior and/or negative behavioral propensity, for instance by selection from a list thereof displayed on a remote device operated by user. Alternatively or additionally, computing device 104 may identify negative behavior by querying a vice database 140 using user-entered data. In an embodiment, vice database 140 may include any data structure for ordered storage and retrieval of data, which may be implemented as a hardware or software module. Vice database 140 may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a vice database 140 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a vice database 140 may reflect categories, cohorts, and/or populations of data consistently with this disclosure.

Still referring to FIG. 1, vice database 140 may be populated with one or more relationships between labels, objects, themes, or the like, as introduced in further detail below, and problematic behaviors and/or negative behavioral propensities; such relationships may be entered in vice database 140 by users, where user entry may include entry by one or more expert users such as psychologists, medical experts, or the like, "crowd-sourced" entry by large numbers of users, which may be aggregated, or the like. Where user entries are aggregated, aggregated results may include comparison of aggregated values to threshold numbers; for instance, a relationship between a given label and a problematic behavior and/or negative behavioral propensity may be recorded where more than a threshold percentage of user entries have identified the two as linked. Identification of problematic behaviors and/or association of attributes of media or the like therewith may be performed, without limitation, as set forth in U.S. Nonprovisional patent Ser. No. 16/673,673, filed Nov. 4, 2019, and entitled "SYSTEMS AND METHODS FOR CLASSIFYING MEDIA ACCORDING TO USER NEGATIVE PROPENSITIES," the entirety of which is incorporated herein by reference.

Relationships between labels, objects, themes, or the like, as introduced in further detail below, and problematic behaviors and/or negative behavioral propensities may alternatively or additionally be entered by computing device 104 from a vice classifier 144 as described below; for instance a label may be entered in vice database 140 with a problematic behavior and/or negative behavioral propensity most probably associated therewith as identified by a vice classifier 144. Computing device 104 may input one or more attributes of an item into a vice classifier 144, and receive an output classifying user inputs to one or more problematic behaviors and/or negative behavioral propensities. Computing device 104 may generate vice classifier 144 using a classification algorithm, defined as a processes whereby a computing device 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, vice training data 148, used herein as training data used to generate vice classifier 144, may include, without limitation, a plurality of data entries, each data entry including one or more items and/or attributes of items and one or more negative behavioral propensities and/or negative behaviors represented thereby and/or associated therewith. Vice training data 148 and/or elements thereof may be entered by users, for instance via graphical user interface forms; an attribute and/or item, and a user may select a label of a negative behavior and/or negative behavioral propensity for each such attribute and/or item provided to the user and/or may enter one or more words in a text entry element, which may be mapped to labels using language processing as described below. As a non-limiting example, a user may identify an alcoholic beverage as linked to alcoholism, one or more elements of or music, literature, and/or other media linked to pornography addiction or the like, paraphernalia related to gambling and/or drug addictions, or the like.

With continued reference to FIG. 1, vice classifier 144 may relate themes, objects, and/or attributes to clusters corresponding to labels of negative behaviors and/or negative behavior propensities. Where vice classifier 144 is updated, for instance by adding to a list of negative behavioral propensities and/or negative behaviors corresponding to clusters and rerunning vice classifier 144 to classify to the updated list, item attributes and/or items stored in memory may be subjected to vice classifier 144 again to update association of item attributes and/or items with negative behaviors and/or negative behavioral propensities; each of these actions, including without limitation rerunning vice classifier 144 to classify to the updated list and/or updating plurality of negative behavioral propensities and/or negative behaviors, may be performed by computing device 104. Vice classifier 144 may be run against one or more sets of vice training data 148, where vice training data 148 may include any form of training data as described above.

Still referring to FIG. 1, vice classifier 144 may alternatively or additionally be customized to user. For instance, and without limitation, a vice classifier 144 create using vice training data 148 as described above may be modified using augmented or updated training data matching negative behavioral propensities and/or negative behaviors to particular proclivities of user. For instance, and for the purposes of illustration only, if user has a media-related addiction such as a pornographic addiction, vice training data 148 may be generated to associate images, words, or other content elements related to user's particular focus of obsession with the negative behavior and/or negative behavioral propensity; such content elements may, for instance represent particular items of clothing, body parts, or the like, which while potentially innocuous for other users may act to inflame the lusts of user if encountered. Elements of vice training data 148 that correspond to such person-specific proclivities may be received from users, including user and/or other persons such as family members, friends, purveyors of content, spouses and/or "significant others" of user, ex-spouses, ex-boyfriends, ex-girlfriends, religious and/or psychological advisors, or the like. Alternatively or additionally, an object classifier as described below may be used to identify relative frequency of appearance of particular visual and/or textual elements in media consumed by user; for instance, a visual object classifier, as described in further detail below, may be run against a series of media selections by the user may identify one or more visual and/or textual objects that appear related to the user's media-related additions, such as. System may match such items to problematic behavior via a user-modified vice-classifier for instance by adding clusters and/or labels to a general vice classifier 144 and/or by adding such items to a vice database 140. As a result, such elements may also be identified, via database lookup and/or vice classifier 144, as matching problematic behavior. For instance, where a particular article of clothing and/or footwear matches a media-based addiction for user, advertisements for such clothing and/or footwear may be blocked, as well as advertisements prominently displaying and/or using such clothing and/or footwear. Vice classifier 144 may be generated and/or trained using any classification algorithms as described above In an embodiment, and still referring to FIG. 1, computing device 104 may be configured to determine that item descriptor 112, item selection, or the like is not suitable, according to any process therefor as described above, and generate a recommendation of an alternate item. For instance, and without limitation, generating the selection guidance 128 may include removing an item that is not suitable from selection guidance 128, causing a next highest-ranking item selection in a ranking of item selections to be displayed, along with any or all items that are suitable. Computing device 104 may alternatively or additionally recommend a different item by generating a new recommendation using any method described above, where the unsuitable item is filtered from a possible result set.

Figure 4:
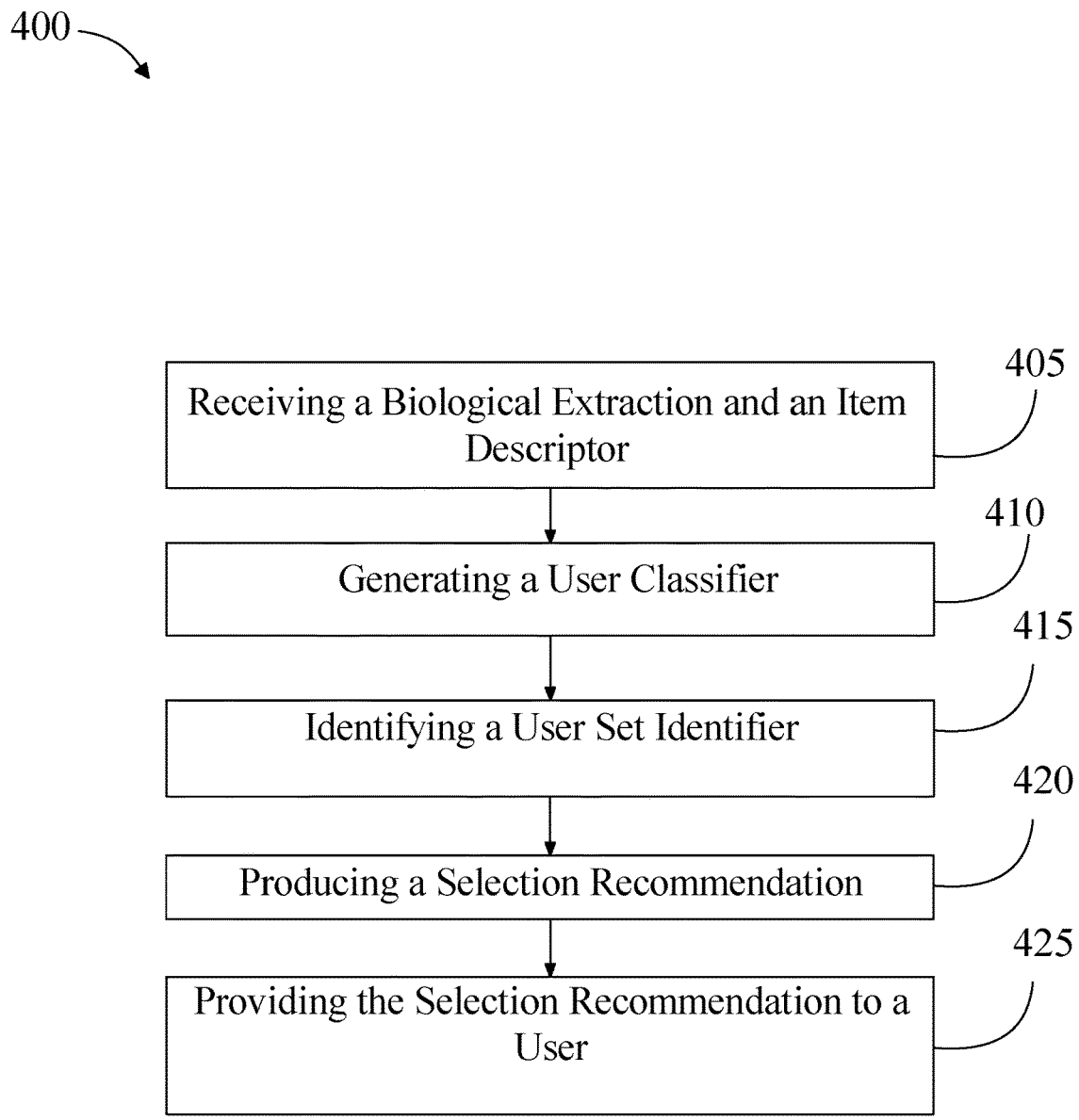
FIG. 4 is a flow diagram illustrating an exemplary embodiment of a method of biologically determined artificial intelligence selection guidance.

Turning now to FIG. 4, an exemplary embodiment of a method 4 of biologically determined artificial intelligence selection guidance 128 is illustrated. At step 405, a computing device 104 receives at least a biological extraction 108 and an item descriptor 112 from a user; this may be performed, without limitation, as described above in reference to FIGS. 1-3. At least a biological extraction 108 may include a profile generated using previous item selections by the user. Item descriptor 112 may include an item selection. Item descriptor 112 may include an item category identifier.

At step 410, and still referring to FIG. 4, computing device 104 generates, using a classification algorithm and a plurality of past extractions, a user classifier 116 matching user data to user sets; this may be performed, without limitation, as described above in reference to FIGS. 1-3. At step 415 computing device 104 identifies, using the classifier and the element user data, a user set identifier matching the user; this may be performed, without limitation, as described above in reference to FIGS. 1-3. At step 420 computing device 104 produces a selection guidance 128 using the user set identifier and the item category identifier; this may be performed, without limitation, as described above in reference to FIGS. 1-3. Producing selection guidance 128 may include identifying at least an action associated with the item descriptor 112, the at least an action identified as having been performed by other users classified to the user set, determining at least a selection associated with the at least an action, and producing the selection guidance 128 using the at least a selection.

At step 425, and continuing to refer to FIG. 4, computing device 104 provides selection guidance 128 to the user; this may be performed, without limitation, as described above in reference to FIGS. 1-3. Computing device 104 may rank selection guidance 128 according to at least a selection criterion. Ranking may include calculating a loss function of the at least a selection criterion and ranking selections to minimize the loss function. Computing device 104 may generate at least a machine-learning model that generates selection suitability determinations using the biological extraction and generate a selection suitability determination for the item descriptor 112 using the at least a machine-learning model. Model may generate an item suitability score using biological extraction and an item attribute list. Computing device 104 may be further configured to determine that the item descriptor 112 is not suitable, and wherein generating the selection guidance 128 further comprises generating a recommendation of a different item.

It is to be noted that any one or more of the aspects and embodiments described herein may be conveniently implemented using one or more machines (e.g., one or more computing devices 104 that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 5:
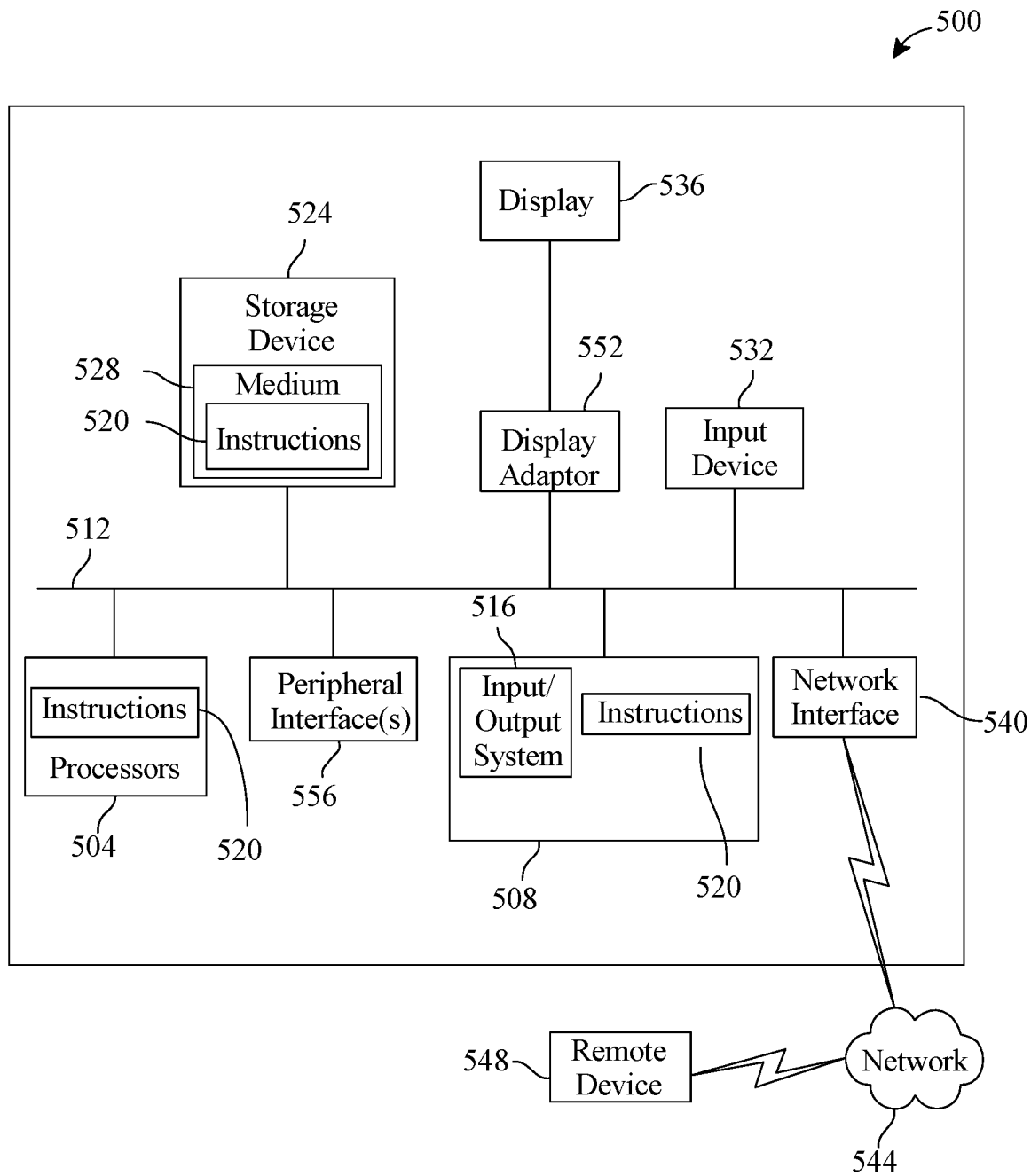
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices 104 may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for biologically determined artificial intelligence selection guidance, the system comprising a computing device designed and configured to:

receive at least a biological extraction and an item descriptor from a user;

generate, using a classification algorithm and a plurality of past extractions, a user classifier matching user data to user sets as a function of the at least a biological extraction;

identify, using the user classifier and the user data, a user set identifier matching the user;

classify the item descriptor to a negative behavior of the user using a vice classifier, wherein the vice classifier is trained with training data correlating user data and item descriptors to user negative behaviors;

produce a selection guidance using the user set identifier and the item descriptor;

calculate, as a function of the negative behavior of the user, an alternate item of the selection guidance; and provide the selection guidance to the user.

2. The system of claim 1, wherein the at least a biological extraction further comprises a profile generated using previous item selections by the user.

3. The system of claim 1, wherein the item descriptor includes an item selection.

4. The system of claim 1, wherein the item descriptor includes an item category identifier.

5. The system of claim 1, wherein the computing device is configured to produce the selection guidance by:
    identifying at least an action associated with the item descriptor, the at least an action identified as having been performed by other users classified to the user set;
    determining at least a selection associated with the at least an action; and
    producing the selection guidance using the at least a selection.

6. The system of claim 1, wherein the computing device is further configured to rank the selection guidance according to at least a selection criterion.

7. The system of claim 6, wherein ranking further comprises:
    calculating a loss function of the at least a selection criterion; and
    ranking selections to minimize the loss function.

8. The system of claim 1, wherein the computing device is further configured to:
    generate at least a machine-learning model that generates selection suitability determinations using the biological extraction; and
    generate a selection suitability determination for the item descriptor using the at least a machine-learning model.

9. The system of claim 8, wherein the model generates an item suitability score using biological extraction and an item attribute list.

10. The system of claim 9, where the computing device is further configured to determine that the item descriptor is not suitable, and wherein generating the selection guidance further comprises generating a recommendation of a different item.

11. A method of biologically determined artificial intelligence selection guidance, the method comprising:
    receiving, by a computing device, at least a biological extraction and an item descriptor from a user;
    generating, by the computing device and using a classification algorithm and a plurality of past extractions, a user classifier matching user data to user sets as a function of the at least a biological extraction;
    identifying, by the computing device, using the user classifier and the user data, a user set identifier matching the user;
    classifying, the item descriptor to a negative behavior of the user using a vice classifier, wherein the vice classifier is trained with training data correlating user data and item descriptors to user negative behaviors;
    producing, by the computing device a selection guidance using the user set identifier and the item descriptor;
    calculating, as a function of the negative behavior of the user, an alternate item of the selection guidance; and
    providing, by the computing device, the selection guidance to the user.

12. The method of claim 11, wherein the at least a biological extraction further comprises a profile generated using previous item selections by the user.

13. The method of claim 11, wherein the item descriptor includes an item selection.

14. The method of claim 11, wherein the item descriptor includes an item category identifier.

15. The method of claim 11, wherein producing the selection guidance further comprises:
    identifying at least an action associated with the item descriptor, the at least an action identified as having been performed by other users classified to the user set;
    determining at least a selection associated with the at least an action; and
    producing the selection guidance using the at least a selection.

16. The method of claim 1 further comprising ranking the selection guidance according to at least a selection criterion.

17. The method of claim 16, wherein ranking further comprises:
    calculating a loss function of the at least a selection criterion; and
    ranking selections to minimize the loss function.

18. The method of claim 1, further comprising:
    generating at least a machine-learning model that generates selection suitability determinations using the biological extraction; and
    generating a selection suitability determination for the item descriptor using the at least a machine-learning model.

19. The method of claim 18, wherein the model generates an item suitability score using biological extraction and an item attribute list.

20. The method of claim 19, further comprising determining that the item descriptor is not suitable, and wherein generating the selection guidance further comprises generating a recommendation of a different item.

* * * * *